United States Patent
Perlman et al.

(10) Patent No.: US 8,613,077 B2
(45) Date of Patent: Dec. 17, 2013

(54) PROVISIONAL ADMINISTRATOR PRIVILEGES

(75) Inventors: Brian Perlman, Bothell, WA (US); Richard S. Eizenhoefer, Redmond, WA (US); Wen-Pin Scott Hsu, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 13/478,107

(22) Filed: May 23, 2012

(65) Prior Publication Data

US 2012/0240221 A1    Sep. 20, 2012

Related U.S. Application Data

(63) Continuation of application No. 12/958,186, filed on Dec. 1, 2010, now Pat. No. 8,196,196, which is a continuation of application No. 11/654,949, filed on Jan. 18, 2007, now Pat. No. 7,865,949.

(51) Int. Cl.
  *G06F 21/00* (2013.01)

(52) U.S. Cl.
  USPC ................................. 726/17; 726/4

(58) Field of Classification Search
  USPC .................................. 726/17, 21, 4
  See application file for complete search history.

(56) References Cited

U.S. PATENT DOCUMENTS

| | | | |
|---|---|---|---|
| 6,922,784 B2 | 7/2005 | Phillips | |
| 6,934,855 B1 | 8/2005 | Kipnis | |
| 7,039,948 B2 | 5/2006 | Harrah | |
| 7,080,406 B2 | 7/2006 | Burnett | |
| 7,356,836 B2 | 4/2008 | Beilinson | |
| 7,707,183 B2 | 4/2010 | Alstrin | |
| 7,865,949 B2 * | 1/2011 | Perlman et al. | 726/17 |
| 8,196,196 B2 * | 6/2012 | Perlman et al. | 726/17 |
| 2002/0046352 A1 | 4/2002 | Ludwig | |
| 2003/0056026 A1 | 3/2003 | Anuff | |
| 2004/0015702 A1 | 1/2004 | Mercredi | |
| 2006/0010442 A1 | 1/2006 | Desai | |
| 2006/0130140 A1 | 6/2006 | Andreev | |

OTHER PUBLICATIONS

Koshutanski, "An Access Control Framework for Business Processes for Web Services", ACM Workshop XML Security, pp. 15-24, Oct. 31, 2003.

Neuman, "Proxy-Based Authorization and Accounting for Distributed Systems", May 1993.

Thorpe, "SSU: Extending SSH for Secure Root Administration", Dec. 6-11, 1998.

Watt, "A Shibboleth-Protected Privilege Management Infrastructure for e-Science Education", May 2006.

* cited by examiner

*Primary Examiner* — Matthew Smithers
(74) *Attorney, Agent, or Firm* — L. Alan Collins; Collins & Collins Intellectual, LLC

(57) ABSTRACT

A system grants "provisional privileges" to a user request for the purpose of provisionally performing a requested transaction. If the provisionally-performed transaction does not put the system in a degraded state, the transaction is authorized despite the user request having inadequate privileges originally.

20 Claims, 4 Drawing Sheets

PROVISIONAL ADMINISTRATOR PRIVILEGES

RELATED APPLICATIONS

This application is a continuation of and claims priority from U.S. application Ser. No. 12/958,186 that was filed on Dec. 1, 2010 and that is a continuation of and claims priority from U.S. application Ser. No. 11/654,949 that was filed Jan. 18, 2007, each of which is hereby incorporated by reference herein in its entirety.

BACKGROUND

Modern computing systems enforce security and control by assigning different privileges that are required to perform certain actions. For example, a user of a computer system may require "administrator" privileges to install new software. In contrast, a lesser level of security, perhaps "user" privileges, may be all that is necessary to launch the program once it is installed. Very many operations require heightened privileges, such as new software activation or licensing.

Software developers and administrators are plagued by the conflict between empowering users with sufficient privileges to perform their desired tasks without hindrance, and preventing users from either maliciously or negligently harming a computer system. In other words, the more privileges a user has, the fewer hurdles the user will face while computing, but the greater the risk of damaging the computing system.

An adequate solution to this problem has eluded those skilled in the art, until now.

SUMMARY

The invention is directed generally at provisional privileges in a computing system. Generally stated, a user request to perform a transaction is evaluated to determine if the user possesses an adequate privilege level. If not, the transaction is evaluated to determine if it can be performed without adversely affecting the computing system. If so, the transaction is authorized despite the user's inadequate privileges.

BRIEF DESCRIPTION OF THE DRAWINGS

Many of the attendant advantages of the invention will become more readily appreciated as the same becomes better understood with reference to the following detailed description, when taken in conjunction with the accompanying drawings, briefly described here.

Embodiments of the invention will now be described in detail with reference to these Figures in which like numerals refer to like elements through-out.

DETAILED DESCRIPTION OF THE DRAWINGS

Various embodiments are described more fully below with reference to the accompanying drawings, which form a part hereof, and which show specific exemplary implementations for practicing various embodiments. However, other embodiments may be implemented in many different forms and should not be construed as limited to the embodiments set forth herein; rather, these embodiments are provided so that this disclosure will be thorough and complete. Embodiments may be practiced as methods, systems or devices. Accordingly, embodiments may take the form of a hardware implementation, an entirely software implementation, or an implementation combining software and hardware aspects. The following detailed description is, therefore, not to be taken in a limiting sense.

The logical operations of the various embodiments are implemented (1) as a sequence of computer implemented steps running on a computing system and/or (2) as interconnected machine modules within the computing system. The implementation is a matter of choice dependent on the performance requirements of the computing system implementing the embodiment. Accordingly, the logical operations making up the embodiments described herein are referred to alternatively as operations, steps or modules.

Generally stated, the described embodiments include mechanisms and techniques for granting "provisional privileges" to a user request for the purpose of provisionally performing a transaction. If the provisionally-performed transaction does not put the system in a degraded state, the transaction is authorized despite the user request having inadequate privileges originally.

Illustrative Systems

The principles and concepts will first be described with reference to a sample system that implements certain embodiments of the invention. This sample system may be implemented using conventional or special purpose computing equipment programmed in accordance with the teachings of these embodiments.

Figure 1:
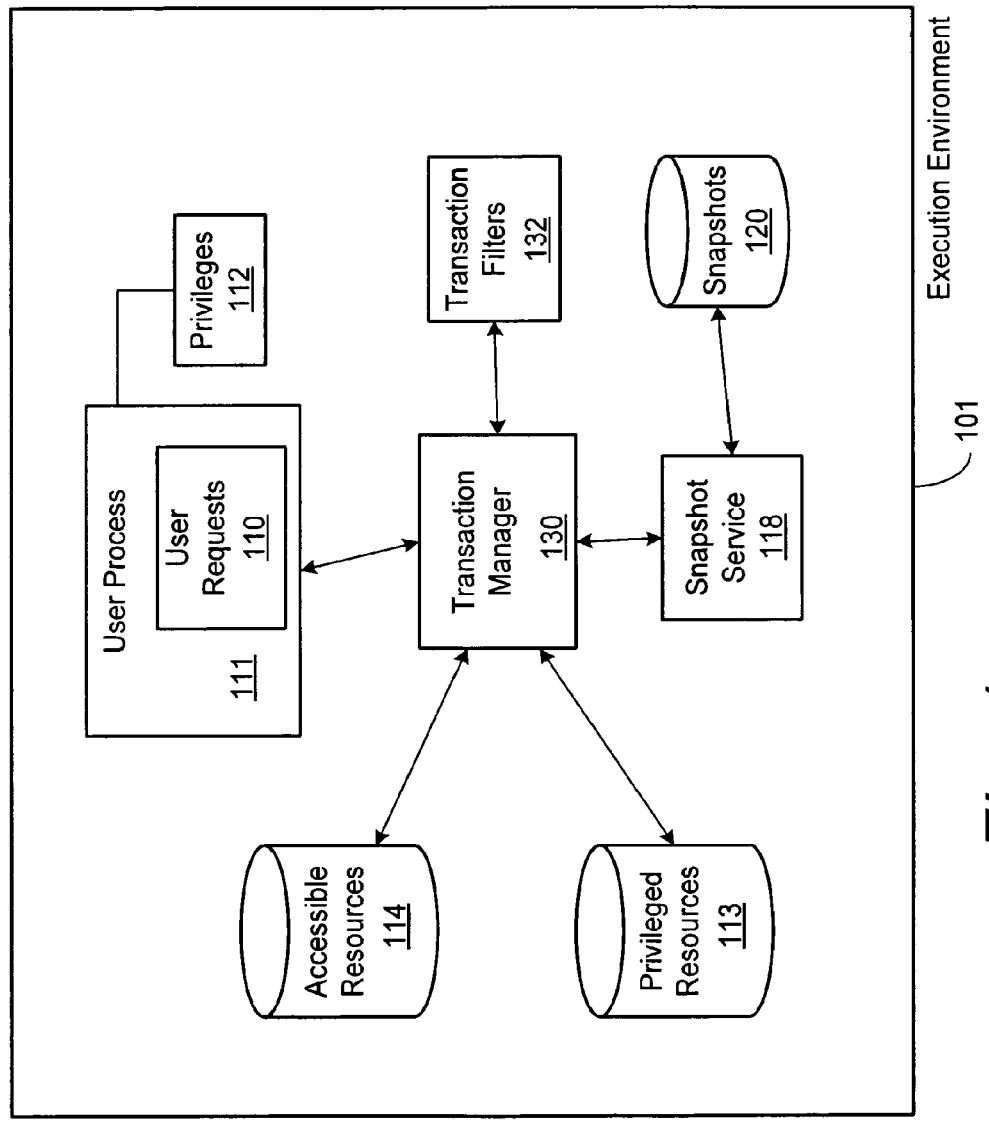
FIG. 1 is a functional block diagram generally illustrating functional components of an execution environment 101 for providing provisional administrator privileges, in accordance with one embodiment of the invention.

FIG. 1 is a functional block diagram generally illustrating functional components of an execution environment 101 for providing provisional privileges. Generally stated, the execution environment 101 is a software environment executing on a host computer. The components illustrated in FIG. 1 are illustrative only and are provided for the purpose of describing the functionality implemented in one embodiment. Many other embodiments may be implemented with components that differ in detail from those described here.

By way of background, when an individual logs on to a computer, the execution environment 101 creates a user process 111 that is granted privileges 112 that have been assigned to the individual's user account. The privileges 112 define how much execution authority the user process 111 has in the execution environment 101. In other words, the privileges 112 specify what system resources, such as executable or data files, the user process 111 can modify or access. In one example, the individual may have the responsibility of administering the execution environment 101. Accordingly, that individual may have a user account with administrative privileges to allow the user process 111 to perform any desired task on the system resources of the execution environment 101. Alternatively, the individual may be a common user with only sufficient privileges 112 to execute installed applications and modify the user's own personal data. Many other sets of privileges are also possible.

Accordingly, the user requests 110 are operations or applications that are executing at the initiation of a user. The user requests 110 represent any transaction that has been initiated by the user process 111. Very frequently, transactions involve accessing and/or modifying system resources. Examples of a transaction include an attempt to install software, an attempt to validate or authorize an existing software installation, an attempt to remove or modify installed software, an attempt to access or modify user data, an attempt to access or modify privileged resources 113, an attempt to access or modify accessible resources 114, and the like. "System resources" may be any file, data stream, address location, register, hardware device, or other computer-readable component of the execution environment 101 or its host computer. System resources commonly include executable files or libraries, scripts, system registries, other configuration files, user data, program data, log files, and the like. In addition, system resources may include other files or information used by the system in conjunction with managing and operating the execution environment 101.

Privileged resources 113 represent any system resources for which the user process 111 does not have sufficient privileges 112 to satisfy the user request 110. For example, privileged resources 113 may include system configuration files or other data stores with configuration information about the execution environment 101 and which require administrator privileges to access but the user only has limited privileges. In one specific example, the privileged resources 113 may include activation or licensing information about software or components that are installed in the execution environment 101. In another example, the privileged resources 113 may be personal data associated with a user account other than the user account with which the user process 111 is associated. In still another example, the privileged resources 113 may include resources that are modified by installing new software or activating newly installed software if the user process 111 does not have sufficient privileges 112 to perform those transactions.

Accessible resources 114 represent any system resources that the user process 111 can access, meaning the user process 111 does have sufficient privileges 112 to satisfy the user request 110. For example, accessible resources 114 may include personal data files owned by the user account with which the user process 111 is associated. In another example, accessible resources 114 may include executable files that are known to be safe for execution by the user process 111. In still another example, the accessible resources 114 may include resources that are modified by installing new software or activating newly installed software, but only if the user process 111 has sufficient privileges 112 to perform those transactions.

A snapshot service 118 is operative to capture "snapshots" 120 of accessible resources 114 and/or privileged resources 113. Generally stated, a snapshot is a copy (or virtual copy) of data as it existed at a particular moment in time. Snapshots are often used for version control and for system maintenance. Accordingly, the snapshot service 118 is used to create snapshots 120 which each reflect a given state of system resources at a particular time.

Transaction filters 132 describe certain transactions that may be performed with provisional privileges. For the purpose of this discussion, the term "provisional privileges" means a heightened set of privileges over those actually associated with a user's account, but which will only be made available to user requests 110 for particular transactions that will not put the execution environment 101 in a degraded state. There may be multiple transaction filters 132, with each transaction filter being associated with a particular type or class of transaction. For example, one transaction filter 132 may be associated with a user request 110 to install software applications. Another transaction filter 132 may be associated with a user request 110 to activate installed software. Yet another transaction filter 132 may be associated with a user request 110 to modify certain important system resources, such as a system registry.

As described in greater detail below, each transaction filter 132 includes data that specifies operations or changes in state that would invalidate the provisional privileges for that transaction. For example, a particular transaction could necessarily involve access to certain portions of a system registry, but should not involve access to other portions of the registry. An attempt to access the other portions would constitute an invalidating operation. In another example, a transaction that changed the state of installed software from authorized (or licensed) to unauthorized (or unlicensed) could be considered an invalidating operation.

A transaction manager 130 is included to administer the provisional privileges in accordance with this particular embodiment. The transaction manager 130 evaluates user requests 110 for the privileges 112 that are assigned to the requesting user process 111. In cases where the assigned privileges 112 are insufficient to perform the requested transaction, the transaction manager 130 is configured to determine if a transaction filter 132 is available that corresponds with the requested transaction. If so, the transaction manager 130 provisionally authorizes the transaction, despite the privileges 112 being insufficient. "Provisionally authorizing" the transaction refers to attempting to perform the transaction as requested, but without actually committing the transaction or without permanently affecting any resources. Simply put, the provisionally authorized transaction could be viewed as a "dry run" or "dress rehearsal." As the user request 110 performs the provisionally authorized transaction, the transaction manager 130 continually monitors the progress to determine if the user request 110 performs an invalidating operation, as specified in the transaction filters 132.

The transaction manager 130 interacts with the snapshot service 118 to capture snapshots 120 of the privileged resources 113. It should be noted that for the purpose of the snapshot 120, the privileged resources 113 may be fewer than all the possible system resources that the user process has insufficient privileges to access, if only a limited set of system resources will be accessible with the provisional privileges. In other words, the privileged resources 113 need not necessarily represent all the system resources that are inaccessible to the user process 111 based on the current privileges 112.

The snapshots 120 may be taken prior to provisionally authorizing the user request 110 and again after the user request 110 has completed the transaction. The transaction manager 130 may compare the pre-transaction and post-transaction snapshots 120 to determine if authorizing the requested transaction would put the system in a degraded state. The degraded state could be specified in the transaction filters 132 (or elsewhere). For the purpose of this discussion, the "degraded state" could involve any one or more of many different situations, such as the system (or any constituent component) becoming unstable, unusable, bloated, excessively large, suffering from unacceptable or unintended data loss, improper modification of another user's data, or any otherwise compromised condition.

If a provisionally authorized user request 110 does not perform an invalidating operation or put the system in a degraded state, the transaction manager 130 may affirm the transaction. In one example, affirming the transaction may constitute actually committing changes made by the user request 110. In another example, affirming the transaction may constitute instructing the user request 110 to re-perform the transaction without limitations. In still another example, affirming the transaction may constitute simply not rolling back the system to its pre-transaction state. Still other examples will be apparent to those skilled in the art.

Figure 2:
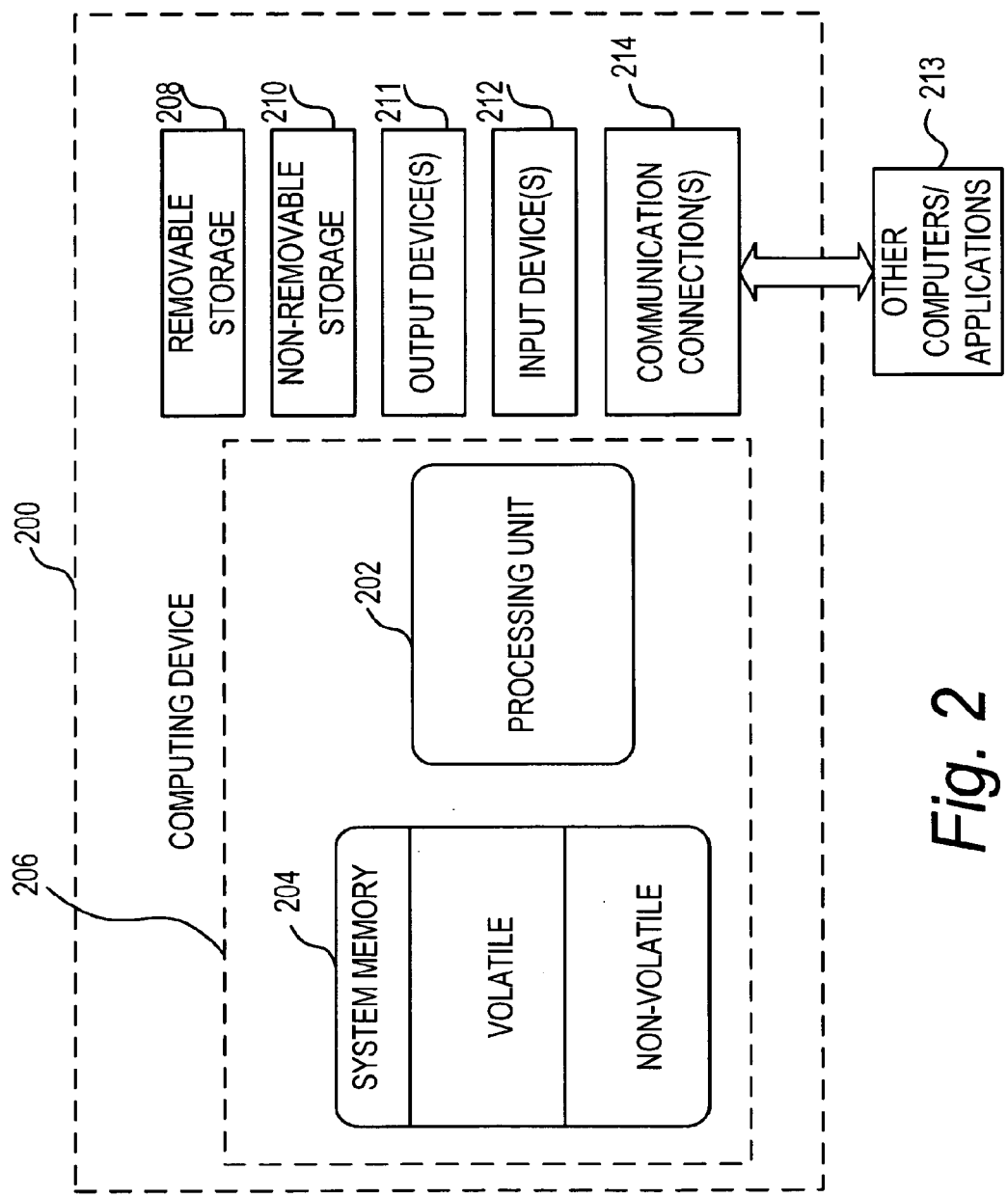
FIG. 2 is a functional block diagram of an exemplary computing device that may be used to implement one or more embodiments of the invention.

FIG. 2 is a functional block diagram of an exemplary computing device 200 that may be used to implement one or more embodiments of the invention. The computing device 200, in one basic configuration, includes at least a processing unit 202 and memory 204. Depending on the exact configuration and type of computing device, memory 204 may be volatile (such as RAM), non-volatile (such as ROM, flash memory, etc.) or some combination of the two. This basic configuration is illustrated in FIG. 2 by dashed line 206.

Additionally, device 200 may also have other features and functionality. For example, device 200 may also include additional storage (removable and/or non-removable) including, but not limited to, magnetic or optical disks or tape. Such additional storage is illustrated in FIG. 2 by removable storage 208 and non-removable storage 210. Computer storage media includes volatile and nonvolatile, removable and non-removable media implemented in any method or technology for storage of information such as computer readable instructions, data structures, program modules or other data. Memory 204, removable storage 208 and non-removable storage 210 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 200. Any such computer storage media may be part of device 200. The term "computer storage medium" (and the like) as used herein refers specifically to a statutory article of manufacture.

Computing device 200 includes one or more communication connections 214 that allow computing device 200 to communicate with one or more computers and/or applications 213. Device 200 may also have input device(s) 212 such as keyboard, mouse, pen, voice input device, touch input device, etc. Output device(s) 211 such as a monitor, speakers, printer, PDA, mobile phone, and other types of digital display devices may also be included. These devices are well known in the art and need not be discussed at length here.

Illustrative Processes

The principles and concepts will now be described with reference to sample processes that may be implemented by a computing device, such as the computing device illustrated in FIG. 2, in certain embodiments of the invention. The processes may be implemented using computer-executable instructions in software or firmware, but may also be implemented in other ways, such as with programmable logic, electronic circuitry, or the like. In some alternative embodiments, certain of the operations may even be performed with limited human intervention. Moreover, the process is not to be interpreted as exclusive of other embodiments, but rather is provided as illustrative only.

Figure 3:
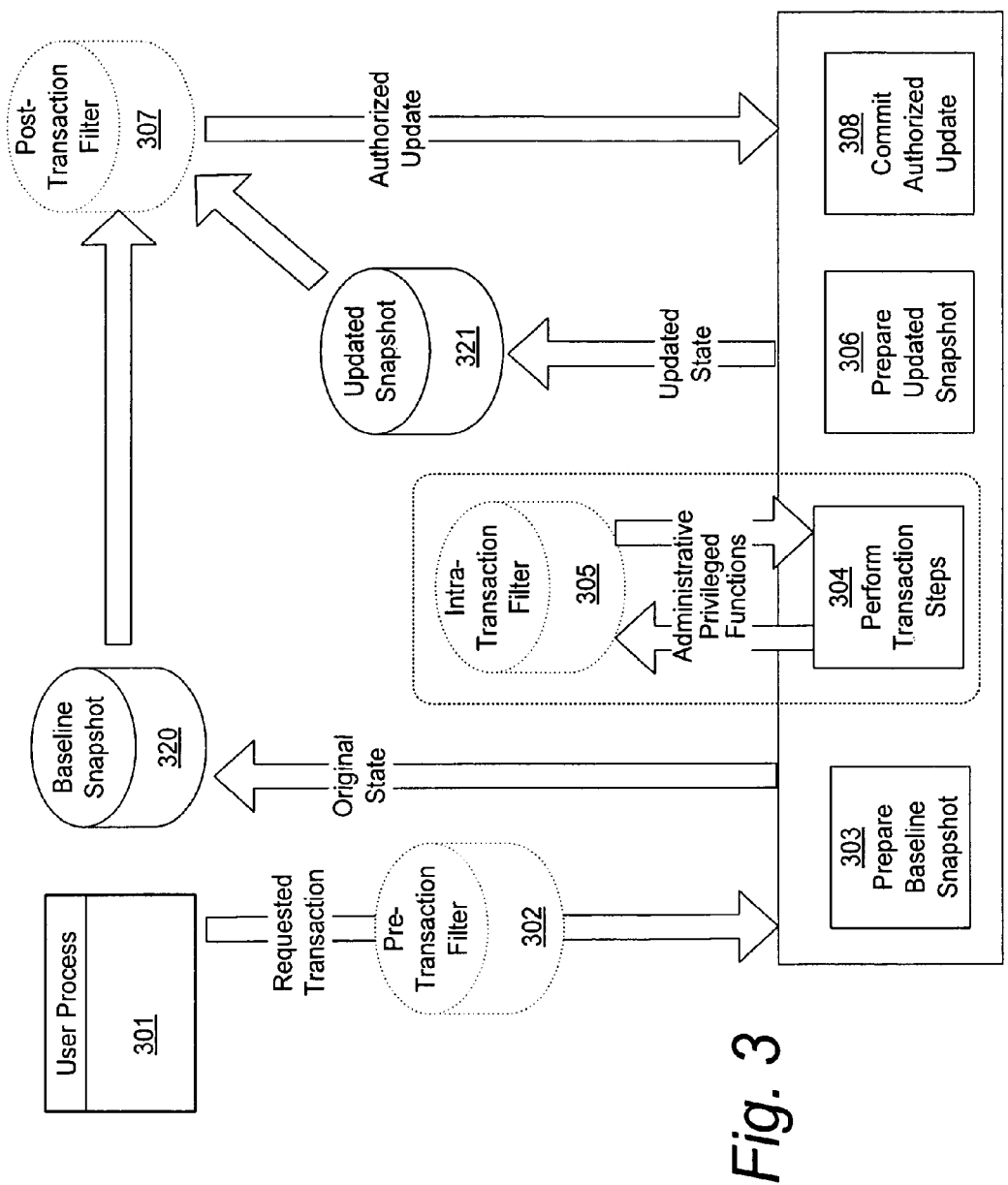
FIG. 3 is an operational flow diagram generally illustrating the how each component cooperates in a system for providing provisional administrator privileges.

FIG. 3 is an operational flow diagram generally illustrating the how each component cooperates in a system for providing provisional administrator privileges. The operations begin at block 301, where a user process initiates a transaction by issuing a request to perform the transaction. In accordance with this implementation, the user process does not have sufficient privileges to perform the requested transaction. For example, the user process may only have limited user privileges while administrator or other heightened privileges are necessary to perform the transaction. Accordingly, the system provisionally grants the user process sufficient privileges in order to determine if allowing the transaction to proceed would compromise the system in any way.

At block 302, a set of pre-transaction filters may be applied to the requested transaction. The pre-transaction filters are transaction filters as described above in conjunction with FIG. 1. However, in this particular implementation, certain transaction filters may be applied to the requested transaction prior to actually allowing any operations to be performed. These pre-transaction filters may be used to determine if the requested transaction is at all possible regardless of what state the system may be in later. For example, the user process may have limited user privileges while requesting a transaction that requires administrative privileges. The pre-transaction filter may be configured to only allow users with heightened privileges to attempt the transaction. Accordingly, the limited-rights user would not be allowed to perform the transaction even with provisional privileges. Accordingly, the pre-transaction filter would immediately terminate the transaction.

At block 303, a baseline snapshot 320 is prepared. The baseline snapshot 320 represents a copy of the system state immediately prior to performing the various operations of the transaction. Capturing the baseline snapshot 320 provides the system with knowledge about exactly what state the system is in prior to performing the transaction. It should be noted that reference to the "system state" should be understood as possibly being only the relevant system state or a subset of the entire system state. In particular, the system state which is captured could be the state of the elements of interest to this particular transaction attempt. For example, for licensing related operations, elements such as current disk free space, current licensing state, license store size, and the like would be relevant, but elements such as current screen resolution or current sound volume would likely not be relevant. Accordingly, the baseline snapshot 320 could represent only a subset of the entire system state, or it could alternatively represent the entire system state.

At block, 304, the various detailed operations of the requested transaction are performed. It should be appreciated that the operations may not be performed in fact. Rather, the operations may be simulated in order to determine their effect on the system and its resources. Alternatively, the operations could actually be performed if doing so is a reversible process.

At block 305, as each of the various operations of the transaction is being performed, it may be tested against an intra-transaction filter to determine if any of the operations constitutes an invalidating operation. As with the pre-transaction filters, the intra-transaction filters are transaction filters that describe what operations and modifications may be performed while provisionally executing a transaction. Examples of intra-transaction filters may include identifying a certain set of resources that may be modified by the transaction, and any attempt to modify or access a resource outside that set constitutes an invalidating operation.

At block 306, an updated snapshot 321 is prepared after the operations of the transaction are complete (e.g., have been completely simulated). The updated snapshot 321 represents a copy of the system state immediately after performing the various operations of the transaction if the transaction were in fact authorized. Capturing the updated snapshot 321 provides the system with knowledge about exactly what state the system would be in after performing the transaction.

At block 307, the baseline snapshot 320 and the updated snapshot 321 are evaluated using post-transaction filters to determine if the completed transaction would put the system in a degraded state. The post-transaction filters are also transaction filters as described above. However, the post-transaction filters specify circumstances or criteria that determine if the state of the system would be degraded by performing the transaction. In one example, the post-transaction filters may compare the baseline snapshot 320 to the updated snapshot 321 to identify the changes made by provisionally performing the transaction. The post-transaction filters may include or identify specific modifications that are allowed, classes of modifications that are allowed, specific modifications that are disallowed, classes of modifications that are disallowed, specific characteristics of the system state that should not be changed, and the like.

At block 308, if the determination at block 307 is positive, meaning that the system state is not degraded, the provisionally authorized transaction is committed. Committing the transaction depends on the particular technique applied for provisionally executing the transaction. For example, if the transaction were merely simulated, then the transaction could be repeated without limitations. If the transaction was actually performed, then the changes that were made could simply be accepted and any limitations removed. These and other alternatives will be appreciated by those skilled in the art.

It should also be noted that in the event that the determination at block 307 is negative, meaning that the transaction would put the system in a degraded state, then the transaction could be undone. For example, the system could be rolled back to its pre-transaction state, perhaps using the baseline snapshot. Alternatively, the user process could simply be returned an error and disallowed to actually perform the transaction.

Figure 4:
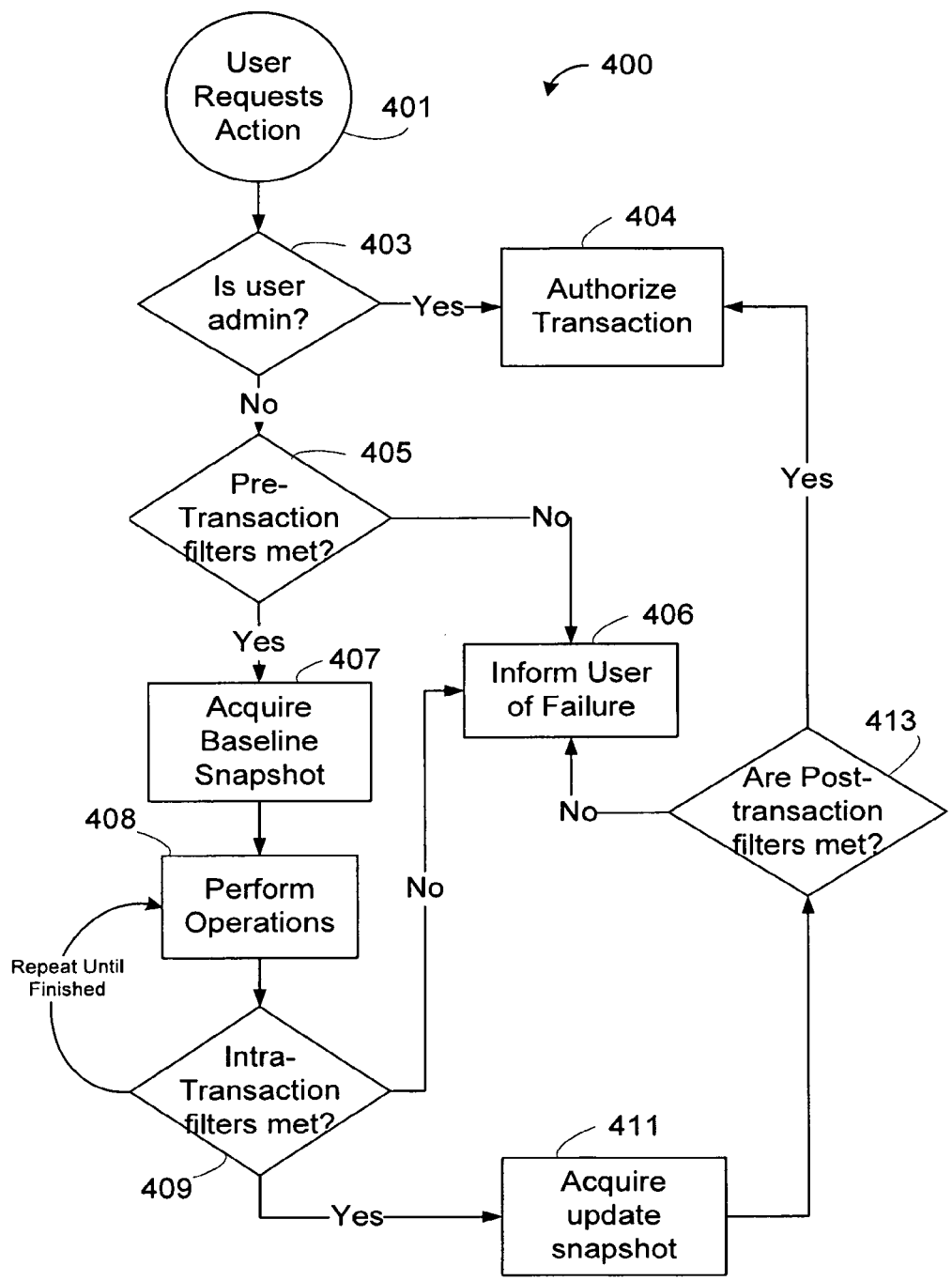
FIG. 4 is an operational flow diagram generally illustrating steps in a process for granting provisional privileges for a requested transaction, in accordance with one embodiment.

FIG. 4 is an operational flow diagram generally illustrating steps in a sample process 400 for granting provisional privileges for a requested transaction, in accordance with one embodiment. The process 400 is performed by a system, sub-system, or component of a computing system.

At block 401, the process 400 begins when a user process requests a transaction. The user process includes privileges. In this example, the privileges are insufficient to perform the transaction. The transaction may be any operation that is performed programmatically on a computing device.

At block 403, a determination is made whether the user process includes the appropriate privileges to perform the transaction. In one example, the transaction may require administrator privileges, so the process 400 determines if the user has administrative privileges. If so, then at block 404, the transaction is authorized.

At block 405, if the user does not have the appropriate privileges to perform the requested transaction, then a set of pre-transaction filters is evaluated to determine if provisional privileges could possibly result in a successful transaction. If not, then at block 406, the requested transaction is denied and the user process is informed of the failure.

At block 407, if the request does not fail the pre-transaction filters, then a baseline snapshot is captured. The baseline snapshot represents the state of the system prior to attempting the transaction.

At blocks 408 and 409, as each of the operations of the transaction are attempted (block 408), intra-transaction filters are evaluated (block 409) to determine if any operations performed during the transaction invalidate the provisional privileges. If any intra-transaction filters are violated while attempting the transaction, the process 400 proceeds to block 406, where the transaction is failed and the user is notified. Blocks 408 and 409 iterate until the transaction is complete.

At block 411, if attempting the transaction does not violate any intra-transaction filters, then an update snapshot is captured. The update snapshot represents the state of the system if the transaction is actually authorized.

At block 413, the update snapshot is compared to the baseline snapshot to determine if the system state has been degraded by attempting the transaction. If not, the transaction is actually authorized at block 404. If the system state would be degraded, the transaction is denied at block 406 and the user is informed of the failure.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A system for provisionally performing a requested transaction, the system comprising:
 a pre-transaction filter configured for determining that performing the requested transaction against the system is possible regardless of a state of the system after completing the requested transaction, where the requested transaction is requested with insufficient privileges;
 a computer configured for provisionally performing the requested transaction with provisional privileges in response to the determining that completing the requested transaction against the system is possible;
 a post-transaction filter configured for determining if the provisionally performed transaction places the system in a degraded state;
 the computer further configured for committing the provisionally performed transaction if the provisionally performed transaction does not place the system in a degraded state; and
 the computer further configured for rolling-back the provisionally performed transaction if the provisionally performed transaction places the system in a degraded state.

2. The system of claim 1, the computer further configured for determining that the pre-transaction filter or the post-transaction filter corresponds to the requested transaction.

3. The system of claim 1, the computer further configured for provisionally authorizing the requested transaction in spite of the insufficient privileges.

4. The system of claim 1 where the pre-transaction filter or the post-transaction filter is associated with a particular class of transaction.

5. The system of claim 1 where the pre-transaction filter or the post-transaction filter describes transactions that can be performed against the system based on provisional privileges.

6. The system of claim 5 where the provisional privileges indicate privileges greater than those associated with a source of the requested transaction.

7. The system of claim 5 where the pre-transaction filter or the post-transaction filter specifies changes in the state of the system that would invalidate the provisional privileges for the requested transaction.

8. A method performed on a computing device, the method for provisionally performing a requested transaction, the method comprising:
 determining, by a pre-transaction filter, that performing the requested transaction against a system is possible regardless of a state of the system after completing the requested transaction, where the requested transaction is requested with insufficient privileges;

provisionally performing the requested transaction with provisional privileges in response to the determining that the completing the requested transaction against the system is possible;
determining, by a post-transaction filter, if the provisionally performed transaction places the system in a degraded state;
committing the provisionally performed transaction if the provisionally performed transaction does not place the system in a degraded state; and
rolling-back the provisionally performed transaction if the provisionally performed transaction places the system in a degraded state.

9. The method of claim 8 further comprising determining that the pre-transaction filter or the post-transaction filter corresponds to the requested transaction.

10. The method of claim 8 further comprising provisionally authorizing the requested transaction in spite of the insufficient privileges.

11. The method of claim 8 where the pre-transaction filter or the post-transaction filter is associated with a particular class of transaction.

12. The method of claim 8 where the pre-transaction filter or the post-transaction filter describes transactions that can be performed against the system based on provisional privileges.

13. The method of claim 12 where the provisional privileges indicate privileges greater than those associated with a source of the requested transaction.

14. The method of claim 12 where the pre-transaction filter or the post-transaction filter specifies changes in the state of the system that would invalidate the provisional privileges for the requested transaction.

15. At least one computer storage device storing computer-executable instructions that, when executed by a computing device, cause the computing device to perform a method for provisionally performing a requested transaction, the method comprising: determining, by a pre-transaction filter, that performing the requested transaction against a system is possible regardless of a state of the system after completing the requested transaction, where the requested transaction is requested with insufficient privileges; provisionally performing the transaction with provisional privileges in response to the determining that the completing the requested transaction against the system is possible; determining, by a post-transaction filter, if the provisionally performed transaction places the system in a degraded state; committing the provisionally performed transaction if the provisionally performed transaction does not place the system in a degraded state; and rolling-back the provisionally performed transaction if the provisionally performed transaction places the system in a degraded state.

16. The at least one computer storage device of claim 15 further comprising determining that the pre-transaction filter or the post-transaction filter corresponds to the requested transaction.

17. The at least one computer storage device of claim 15 further comprising provisionally authorizing the requested transaction in spite of the insufficient privileges.

18. The at least one computer storage device of claim 15 where the pre-transaction filter or the post-transaction filter is associated with a particular class of transaction.

19. The at least one computer storage device of claim 15 where the pre-transaction filter or the post-transaction filter describes transactions that can be performed against the system based on provisional privileges.

20. The at least one computer storage device of claim 19 where the provisional privileges indicate privileges greater than those associated with a source of the requested transaction, and where the pre-transaction filter or the post-transaction filter specifies changes in the state of the system that would invalidate the provisional privileges for the requested transaction.

* * * * *